Dec. 29, 1964  C. D. JOHNSON  3,163,122
APPARATUS FOR SETTING AND DRIVING RAILROAD SPIKES
Filed March 6, 1961  11 Sheets-Sheet 5

Dec. 29, 1964  C. D. JOHNSON  3,163,122
APPARATUS FOR SETTING AND DRIVING RAILROAD SPIKES
Filed March 6, 1961  11 Sheets-Sheet 6

Inventor
Charles D. Johnson
by Olson, Mecklenburg, Pendleton & Neuman Attys

Dec. 29, 1964 C. D. JOHNSON 3,163,122
APPARATUS FOR SETTING AND DRIVING RAILROAD SPIKES
Filed March 6, 1961 11 Sheets-Sheet 7

Inventor
Charles D. Johnson
by Olson, Mecklenburger, Von Holst
Pendleton & Neuman Attys

Dec. 29, 1964

C. D. JOHNSON 3,163,122

APPARATUS FOR SETTING AND DRIVING RAILROAD SPIKES

Filed March 6, 1961

United States Patent Office 3,163,122
Patented Dec. 29, 1964

3,163,122
APPARATUS FOR SETTING AND DRIVING
RAILROAD SPIKES
Charles D. Johnson, Fairmont, Minn., assignor to Fairmont Railway Motors, Inc., Fairmont, Minn., a corporation of Minnesota
Filed Mar. 6, 1961, Ser. No. 93,481
1 Claim. (Cl. 104—17)

This invention relates generally to new and useful improvements in apparatus for driving railroad spikes.

In the laying of rails, it is customary to use tie plates and to place the rails upon the tie plates. Tie plates usually are provided with holes to receive the spikes for opposite sides of the rail. The tie plates differ in size and in the spacing of the spike receiving holes, depending, usually, upon the size of the rail.

The conventional practice is to drive two spikes in the diagonally opposite spike holes, i.e., one on the field side of the rail and the other on the gauge side. It will, of course, be understood that, in the driving of the spikes, the lip of the spike head is positioned to overlie the base of the rail.

While attempts have been made to provide apparatus which will both set and drive spikes simultaneously on the field and gauge sides of the rails, so far as is known, it is still the practice for workmen manually to set the spikes first and then drive them, either manually or by means of spike driving apparatus. The preliminary setting or initial driving of the spikes presents a considerable problem inasmuch as spikes must be set in the proper vertical plane and since, in track work, a tremendous number of spikes are driven in a single day, the operation is a slow, laborious, and relatively expensive one.

A further problem encountered when providing apparatus for driving spikes is that it is necessary to spot the spikes to be driven in substantially perfect alignment with the holes in the tie plates and normal to the plane of the tie. In order to simplify and expedite the operation, it is necessary to provide a railway car which moves along the track and, whether power driven, which is preferable, or manually moved along the track, inertia forces are involved which make difficult the registering operation. This presents an additional problem which must be solved if the best and most efficient results are to be obtained.

The above are a few of the problems which must be solved in providing a practicable apparatus for the purpose of driving railroad spikes.

A general object of the invention is to provide apparatus wherewith railroad spikes can simultaneously be set and driven on both the field and gauge sides of a single rail.

Another object of the invention is to provide means whereby the spike driving apparatus may be quickly and easily spotted or located so that the spikes will be in desired alignment with the underlying holes in the tie plates.

Another object of the invention is to provide means whereby a single workman positioned on a wheeled vehicle carrying the spike setting and driving mechanism can quickly and easily cause movement of the vehicle in the forward and reverse directions, to locate spike setting and driving apparatus in an approximately correct position and then manipulate the apparatus quickly to make the final necessary adjustment for accurate setting and spike driving.

Again, it is an object of the invention to provide mechanism whereby a second operator conveniently located on a wheeled vehicle can supply spikes from a single location on the vehicle for both sides of the rail and means whereby spikes will automatically then be moved to the spike setting and driving position.

Further and specific objects of the invention are to provide means whereby the lip portions of the spike heads of the spikes to be set and driven on one side of the rail can be manipulated to assure that the lip of the head be pointed toward the rail when reaching the spike setting and driving position.

Further and more specific objects of the invention will appear as the specification proceeds to describe the invention in connection with the accompanying drawings, in which.

*Identification of Some of the Main Parts of the Apparatus*

Before describing the apparatus in detail it is believed a general description of some of the main parts of the apparatus and the mode of operation will facilitate an understanding of the invention. Referring more particularly to FIGS. 1, 2, 25 and 26, the apparatus comprises a main vehicle A designed to travel on the rails of a railway track. It is designed to carry two operators for whom seats D1 and D2 are provided. There are also spike setting and driving mechanisms SD, a prime mover C, and an hydraulic pump C1 driven thereby, reservoir L for hydraulic fluid, hydraulic fluid accumulator M, hydraulic motors FM and RM for driving the main vehicle in forward and reverse directions, various hydraulic control valves and means for manipulating them, an air control valve, micro-switches together with means for actuating them, and other parts, such as conduits, for conveying hydraulic fluid and air to various devices which are actuated by these mechanisms.

A trailer vehicle B is provided and is a wheeled vehicle adapted for rail travel and carries a prime mover, air pump, air reservoirs, and associated parts for supplying air under pressure to the main air control valve N on the main vehicle. It is connected to move with the main vehicle.

Prime mover C, as shown, is an internal combustion engine, but may be any other suitable means.

Seat D1 is occupied by the main operator who controls forward and reverse movement of the main vehicle through rockable foot control means E on the platform of the vehicle and swings levers F and G during operation of the apparatus.

Figures 1, 20A:
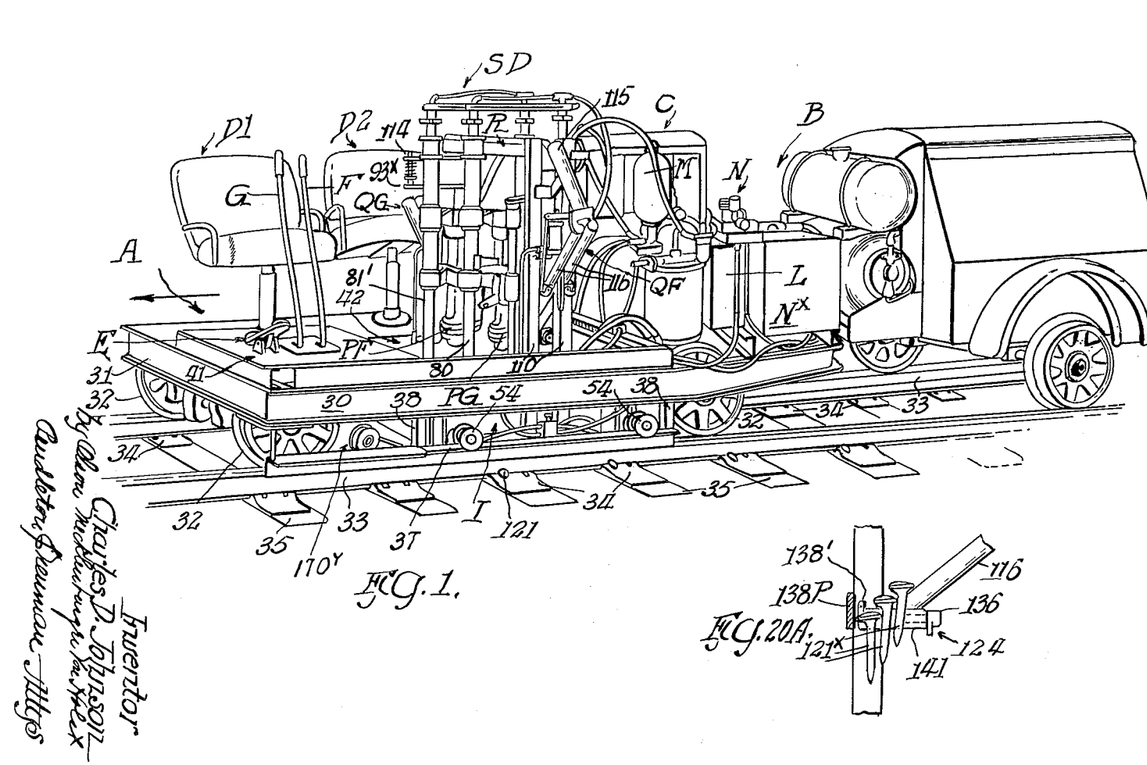
FIGURE 1 is a perspective view of the apparatus, as viewed from the field side, which includes a main wheeled vehicle and a trailer vehicle carrying means for supplying air under pressure.
FIG. 20A is a view on line 20A—20A of FIG. 20, but illustrating additional parts, and on a smaller scale.

When lever F is pushed away from the seat D1 the movable sub-frame I is moved longitudinally through a suitable bell crank and linkage mechanism to the right as viewed in FIG. 1, and when pulled toward seat D1 is moved in the opposite direction.

Lever G is swung by the operator on seat D1 for causing raising and lowering of certain parts of the spike setting and driving mechanism which are supported on the movable sub-frame I. By moving lever G toward seat D1, hydraulic pressure is applied to two pairs of cylinders K to raise them and to cause upward movement of various parts carried thereby. Movement of lever G away from seat D1 permits hydraulic fluid from cylinder K to return to the reservoir L and allows cylinder K and parts carried thereby to lower by gravity, as will be explained in detail later. When lever G is in neutral position fluid does not flow to or away from cylinders K.

Reservoir L is an hydraulic fluid reservoir from which hydraulic fluid is drawn and to which fluid is returned during the operation of the apparatus.

Accumulator M is an hydraulic fluid accumulator which functions to store and periodically discharge fluid under controlled conditions.

There are main air valves N controlled by means of a solenoid which in turn is energized and de-energized under the control of certain micro-switches which are actuated during a cycle of operation of the apparatus.

OF and OG are spike locating assemblies which are alike except that OF is positioned to locate the spike on the field side of the rail, while OG is positioned to locate the spike on the gauge side of the rail.

PF and PG are air hammers which are alike in construction except that PF is positioned to drive the spike on the field side of the rail while PG is positioned to drive the spike on the gauge side of the rail.

QF and QG are spike feeder slides which feed spikes downwardly by gravity and which are alike except that QF is for the field side and QG for the gauge side of the rail. Another difference is that there is associated with QF a conveyor mechanism R for conveying spikes from the operator's side of the vehicle to and discharging them into slide QF. Additionally, there is associated with slides QF a flip-over device S which serves to flip the spikes discharged into guides QF so that the spikes hang from the guides QF with the points downwardly and with the lip of the spike pointing in the correct direction.

The spike conveyor R, as shown, comprises an endless chain conveyor on the upper pass of which the operator places spikes to discharge them into the spike feeder guides QF.

General Statement Regarding Operation of Apparatus

It is assumed that the prime mover C is in operation driving the hydraulic pump and providing fluid under pressure to the system. It is also assumed that the air compressor is in operation on the trailer supplying air under pressure to the main air valve N on the main vehicle.

Normal operation requires two operators, one in seat D1 and the other in seat D2.

By means of foot pedal E the operator in seat D1 causes movement of the main vehicle along the rails until the spike locating means are in approximately the right position over the spike receiving holes of the tie plate where the spikes are to be driven. Final adjustment will then be made by shifting the movable sub-frame I to assure that the spike positioned in the spike locating assemblies OF and OG are accurately aligned with the holes in the tie plate.

Assume also that there has been one or more cycles of operation and that the vertical framing which carries the spike locating assemblies OF and OG and the hydraulic cylinders K, together with the parts carried thereby, is in its uppermost position. The swingable jaws of the spike locating assemblies will be in closed position at this time and a spike will be positioned therein with the spike head on the upper side of jaws and with several inches of spike extending below the jaws and pointing directly at the underlying hole in the plate in a position to be observed by the operator in seat D1 in at least spike locating assembly OF.

At this time the lever G would be in neutral position, having been returned by spring means against which the operator had been holding the lever whilst the mechanism was moving upwardly.

To lower the mechanism, the operator moves lever G in a direction opposite to that in which it is moved to raise the cylinders which, through a spool valve, will permit hydraulic fluid to flow back to the reservoir.

By gravity the entire driving assembly moves down together until the bottom end of the vertical guide frame thereof engages an adjustable vertical stop on a fixed part of the sub-frame of the vehicle. At this time, further downward movement of the vertical guide frame is prevented as the driving assembly continues its downward movement, parts sliding on certain vertical guide rods of the vertical guide frame. This causes hammer socket of the air hammer to engage the spike head and drive the spike about an inch and one half, because means will have functioned to open the main air valve N, whereby to deliver air to the air hammer and set it in operation.

A cam, carried by one of the hydraulic cylinders K, engages a spool of a spool valve associated with the hydraulic control of the spike locating assembly, permitting hydraulic fluid to flow to the reservoir, which results in opening jaws of the spike locating assembly, thus permitting the front head of the air hammer to continue down into a position between the open jaws and letting a reciprocating anvil complete the driving of the spike to final position.

To move the hydraulic cylinder assembly and associated parts upward, the operator in seat D1 moves lever G to admit hydraulic fluid to the upstanding rods on which the cylinders are slidable, causing the cylinders K and all connected parts to raise, excepting vertical guide frame which has a delayed action and does not move until an upper sleeve supported by upper brackets attached to the cylinders K engages under an upper horizontal overhanging part of the vertical guide frame, whereupon the vertical guide frame moves upwardly with the rest of the structure.

When the hydraulic cylinder assembly reaches its uppermost position, mechanism functions to close the jaws of the spike positioning assembly so that it is ready to receive another spike.

It will be understood that the operator in seat D2 continues to place spikes in spike feeder slides on the gauge side of the apparatus and on the conveyor chain for movement to and discharge into the spike feeder slides of the field side; also, that the spikes on the field side will be flipped over as before explained, and that the spikes will be intermittently released by the upper spike arresting mechanism and the lower spike arresting mechanism, in order to supply a spike to each of the spike positioning assemblies during each cycle of operation.

The manner in which all of the parts function and the details of construction thereof will be described later, but it is thought the foregoing general statement will be sufficient to facilitate an understanding of the construction and mode of operation thereof, as later explained in more detail.

The Main Vehicle

The main vehicle A (see FIG. 1) comprises a frame which includes longitudinal side members 30 cross connected by transverse members 31. The framing of the vehicle is supported upon flanged wheels 32 for engagement with the rails 33, the base portions of which engage tie plates 34 supported upon ties 35 in conventional manner. The tie plates 34 have holes on the gauge and field sides of the rail to permit driving of the spikes into the ties with the lips of the spike heads extending into overhanging engagement with the base of the rail in well-known manner.

At each side of the main vehicle A below the longitudinal side frame members 30 is a longitudinal member 37 supported by means of the vertical members 38. The members 37 serve as rails on which the movable sub-frame I rolls in response to swinging movement of lever F by operator in seat D2 (see FIGS. 1 and 2) and as explained in detail later.

Movement of the main vehicle along the rails in forward and reverse direction is effected by the operator in seat D1 through rockable foot pedal E and hydraulic motors FM–RM under the vehicle frame.

On the frame of the main vehicle there is positioned a platform 41 on which the operators' chairs D1 and D2 are supported. It will be noted that the platform 41 is of such shape that an open well 42 is provided through which the lower portions of the spike setting and driving mechanism extends and which, as will be explained later, permits the operator on seat D1 to see the spike locating assembly and the spike positioned therein so that registry of the spikes with the holes in the tie plates can be effected.

In addition to the parts mentioned above there is mounted on the main vehicle, the prime mover C, hydraulic pump C1, accumulator M, main air valves N and N', reservoir L, and certain other parts which will be referred to in detail later.

The Trailer Vehicle

The trailer vehicle B is a wheeled vehicle adapted to travel on the rails of the railway and is coupled to move with the main vehicle A. As shown it is a conventional piece of equipment including a prime mover, air pump and air reservoirs operative to supply air under pressure through a suitable conduit to the main air valve N on the main vehicle and, also, to air valve N'.

The Movable Sub-Frame and Parts Carried Thereby

Figure 2:
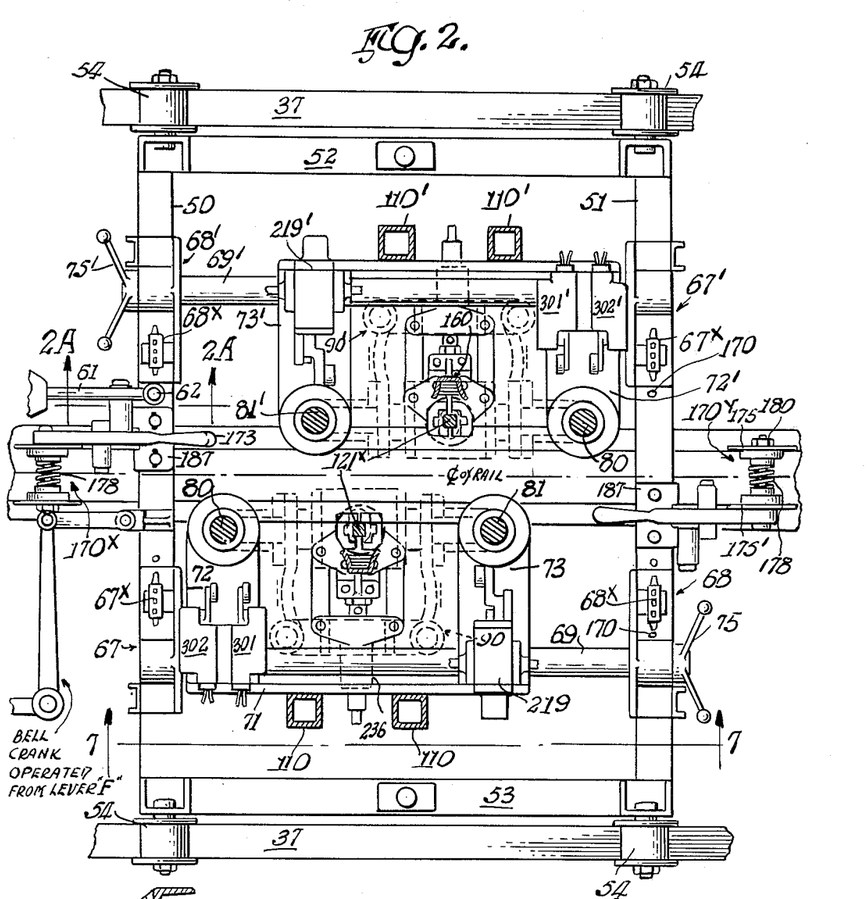
FIG. 2 is a horizontal sectional view substantially on the line 2—2 of FIG. 1, illustrating movable sub-frame, on the main vehicle, and parts positioned thereon.

The movable sub-frame I is best tshown in FIGS. 1 and 2 and comprises a horizontally disposed frame consisting of spaced members 50 and 51 which extend transversely of the main vehicle and rail, and connecting members 52 and 53 which extend lengthwise of the main vehicle and parallel to the rail.

The movable sub-frame is adapted for movement forwardly and rearwardly, relative to the frame of the main vehicle, by means of rotatably mounted flanged wheels 54 which ride upon the members 37 at each side of the main frame.

Figure 2A:
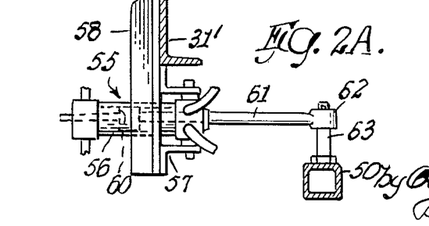
FIG. 2A is a detailed vertical sectional view substantially on the line 2A—2A of FIG. 2, but showing some additional portions to the left which do not appear in FIG. 2.
Figure 25:
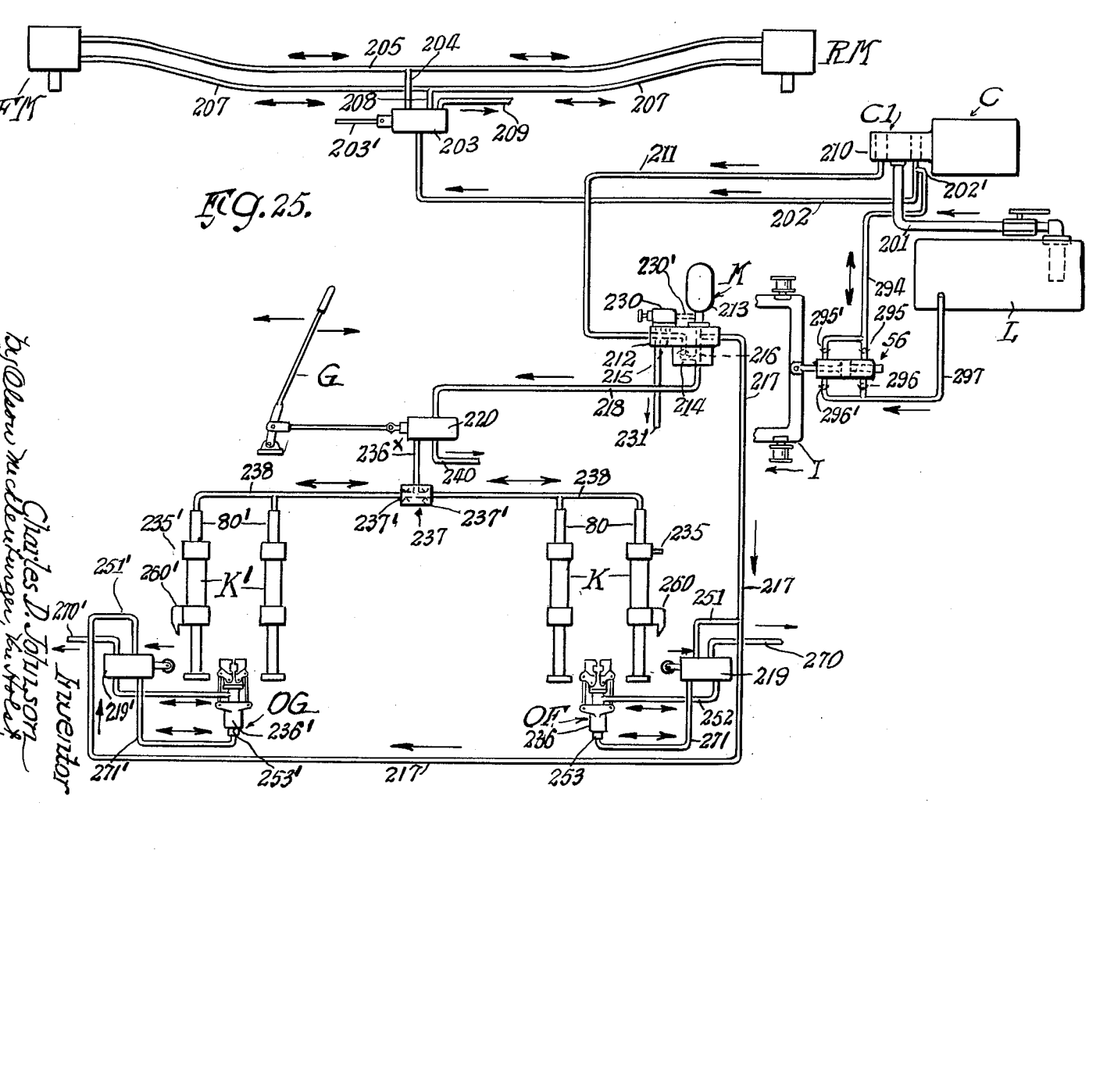
FIG. 25 is a diagrammatic view of the hydraulic system and certain parts associated therewith for illustrative purposes.

Hydraulically operable means 56, best shown in FIGS. 2, 2A and 25, are provided to prevent undue movement of the movable sub-frame along the members 37 of the main frame, as a result of inertia forces created by sudden movement of or change of direction of the main vehicle. The hydraulic circuit will be explained later, but the structure comprises a hydraulic cylinder 56 (see FIG. 2A) secured against movement by attachment to brackets 57 affixed to a member 58 depending from the cross member 31' of the vehicle main frame. Positioned within the cylinder 56 is a piston portion 60 attached to a piston rod 61, the end 62 of which is attached to a stud 63 secured to and upstanding from the movable sub-frame cross member 50.

Mounted on cross members 50 and 51 of the movable sub-frame I are gauging mechanisms 65, the specific construction and operation of which will be described later under a separate heading entitled "Gauging Mechanism."

Supported from the movable sub-frame I is the spike locating or setting and spike driving mechanism to which the reference SD, as a whole, is applied in FIG. 1. However, since this mechanism comprises two assemblies, one for the field side of the rail and the other for the gauge side of the rail, and since, with the exceptions noted later, they are alike in construction and operation, the corresponding parts on the gauge side will bear the same numerals as those on the field side, but with a prime (') added.

Upstanding from the movable sub-frame cross members 50 and 51 are brackets 67 and 68. Extending between brackets 67 and 68 with the ends fixed therein are upper and lower rods 69 and 70, the brackets 67 and 68 being movable along the transverse sub-frame members by means which will be described later, more particularly in connection with FIGS. 2, 7 and 8.

Mounted on the rods 69 and 70 and connected for movement as a unit by plate 71 along these rods are two cantilever brackets 72 and 73. To move the cantilever brackets 72 and 73 along the rods 69 and 70 for adjustment of the spike locating assembly OF, and other parts carried by the cantilever brackets, there is provided a hand wheel 75 mounted to cause rotation of shaft 76, the inner end of which is threaded and operates in a threaded opening in cantilever bracket 73. Rotation of hand wheel 75 in a clock-wise direction causes movement of the cantilever brackets and associated parts in one direction and movement of the hand wheel 75 in a counter-clockwise direction causes the cantilever brackets and associated parts to move as a unit in the opposite direction.

Figures 6, 11:
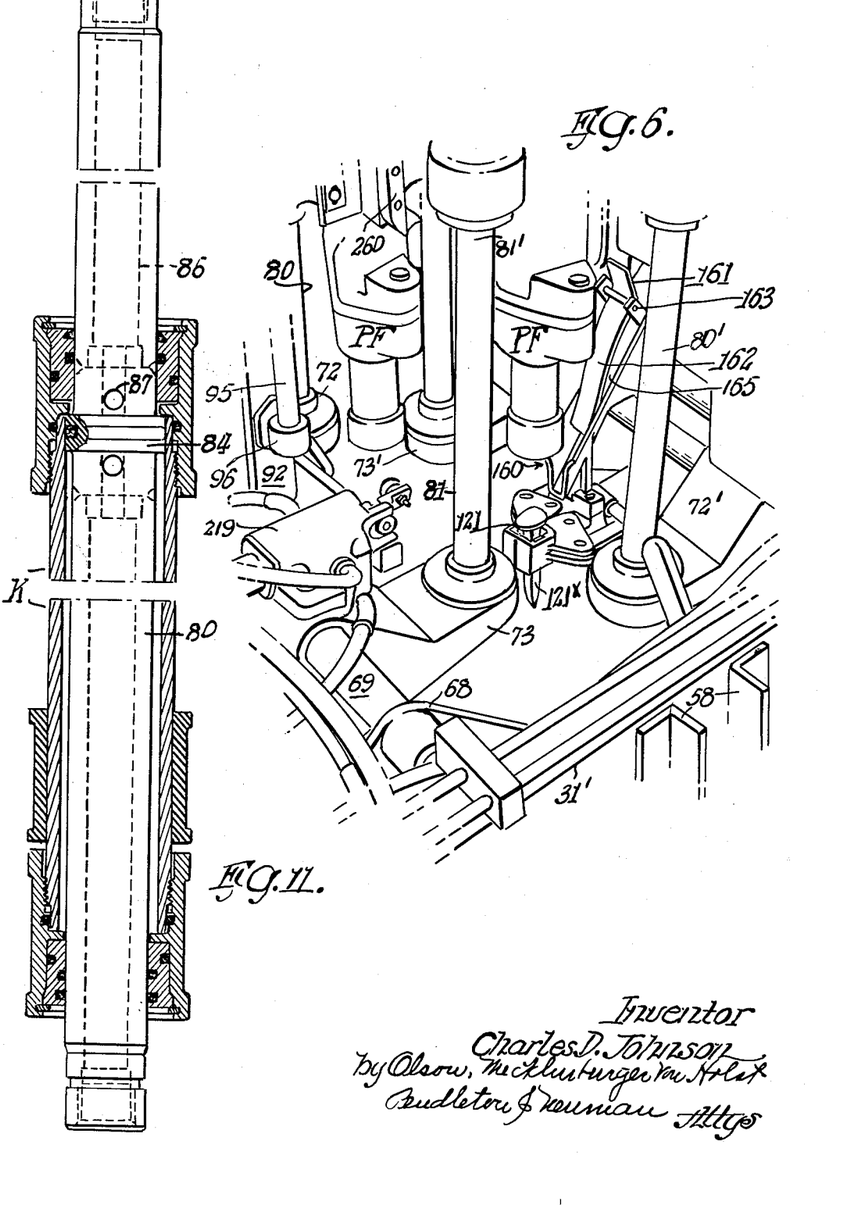
FIG. 6 is a fragmentary perspective view of the lower portions of certain of the parts as viewed from the left hand seat appearing in FIG. 1 and showing the visibility the operator has of the spike in one of the spike locating assemblies.
FIG. 11 is a vertical view, partly in elevation and partly in section, through one of the hydraulic cylinders of which there are two pairs, and which serve to raise the two air hammers, the two spike locating assemblies, and the two chutes which finally guide and deliver one spike to each of the two spike locating assemblies for future controlled gravity descent, the scale being enlarged with respect to the showing in other of the figures.

Secured to and upstanding from the ends of the cantilever brackets 72 and 73 are rods 80 and 81, the upper ends of which are connected together by a brace member 83 which provides rigidity for the assembly. Vertically slidable on the rods 80 and 81 are cylinders K, the specific construction of which, in relation to the rods 80 and 81 is best shown in FIG. 11. It will be seen that the rod 80 has a piston-like portion 84 intermediate its ends.

That part of the rod extending upwardly of the cylinder assembly has a central bore 86 for receiving hydraulic fluid under pressure for discharge through cross drill openings 87, immediately above the piston portion which will raise the cylinders K and all parts connected therewith.

A more detailed explanation of the operation will be given later in connection with the diagrammatic view FIG. 25.

As is perhaps best shown in FIGS. 1, 4, and 24, 90, as a whole, represents a vertical framing structure. It comprises a pair of spaced bars 91 and 92 cross connected at the top by a member 93, having portions 93' with hollow bearings 94 into which the upper ends of rods 95 extend and in which they are secured against movement. The lower ends of rods 95 enter and are affixed in bearing brackets 96 projecting from the sides of the bars 91 and 92 adjacent the lower ends thereof. The vertical framing assembly is completed by a member 97 which extends between and is connected to the lower ends of the bars 91 and 92.

In order to support the vertical framing assembly 90 there is provided upper and lower brackets 98 and 99 which are connected together by a vertical plate portion. The brackets 98 and 99 are fixedly attached to the cylinders at 100 and 101, respectively. The bracket 98 includes a bearing portion 102 and the bracket 99 includes a bearing portion 103 through which the rods 95 of the vertical framing assembly extend to permit relative vertical sliding movement of the hydraulic cylinders K and the brackets 98 and 99 relative to the vertical framing assembly.

The purpose of this relative movement will be described later.

Mounted between the two vertical hydraulic cylinders and affixed to the brackets 98 and 99 to move up and down with the hydraulic cylinders is an air hammer PF. The manner in which the air hammer functions to drive the spike will be explained later.

The Spike Conveyor Mechanism

In order to convey spikes from a position on the main vehicle which is adjacent the operator's seat D2 on the gauge side of the rail to the field side there is provided a conveyor in the form of an endless chain 105 which operates in hollow trough 106 disposed transversely of the main vehicle and rail. The details are best shown in FIGS. 1, 4, 4A, 4B, 18 and 19. The chain 105 passes around a sprocket 107 mounted on shaft 108, which is mounted for rotation in brackets 109 attached to the upper ends of a pair of spaced apart upright tubular members 110, the lower ends of which are attached to the plate 71 which interconnects the two cantilever brackets 72 and 73. The other end of the chain passes around a sprocket 107' on the gauge side of the trough.

Figure 3:
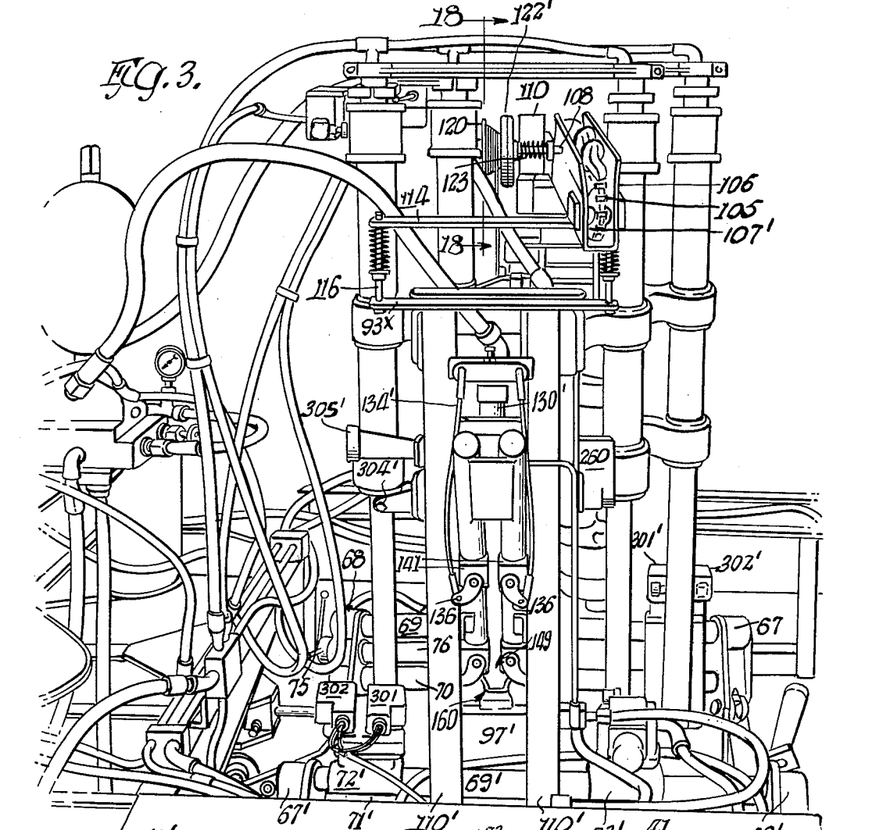
FIG. 3 is a fragmentary perspective generally elevational view of parts mounted on the movable sub-frame as viewed from the gauge side of the vehicle.

The field side of the trough 106 is supported by a bracket 111 attached to the upper ends of the upright tubular members 110 and the gauge side is supported, as best shown in FIG. 3, by means of a bar 114 through the medium of coil springs mounted on rod members 116 secured to and upstanding from member 93x on the top of members 110' on the gauge side of the rail.

Figures 4, 4A, 4B:
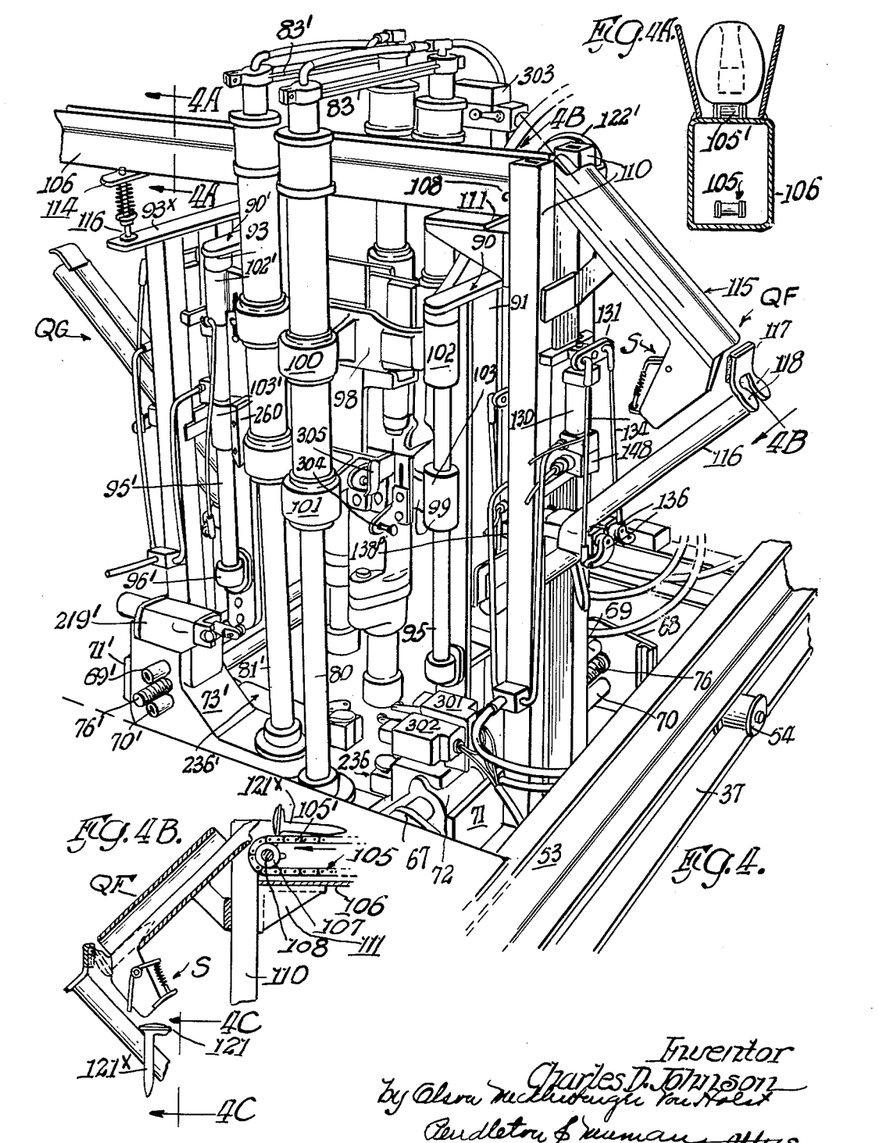
FIG. 4 is a fragmentary perspective generally elevational view of the parts mounted on the movable sub-frame, but from the field side as viewed from the left end of FIG. 1 at an angle of about 45 degrees.
FIG. 4A is a detail vertical section on the line 4A—4A of FIG. 4, but on a larger scale.
FIG. 4B is a fragmentary detail vertical sectional view on the line 4B—4B of FIG. 4.
Figures 4C, 16, 18, 19, 24:
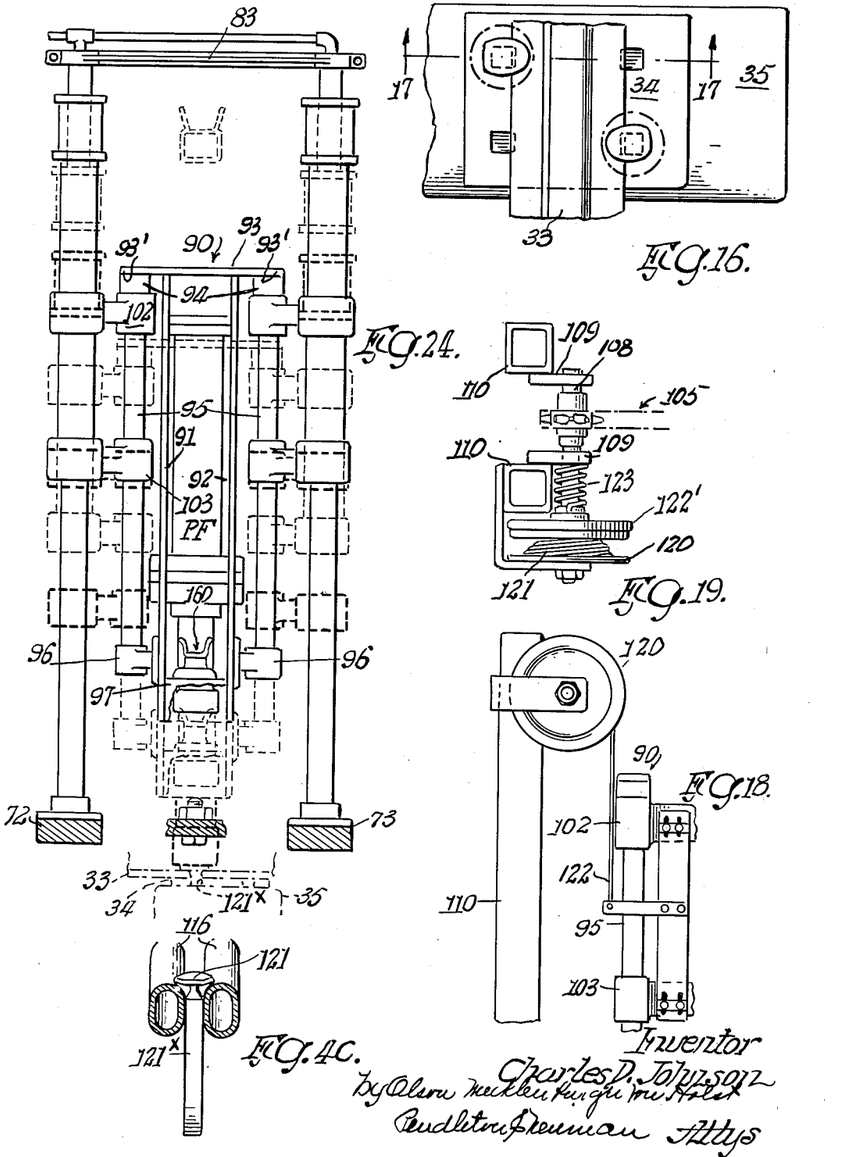
FIG. 4C is a fragmentary detail vertical sectional view on the line 4C—4C of FIG. 4B showing how the spike is supported between the tubular guides.
FIG. 16 is a fragmentary plan view of a tie, tie plate, rail and spike assembly.
FIG. 18 is detailed fragmentary vertical elevational detail view on the line 18—18 of FIG. 3 showing the means for advancing the spike feed chain which intermittently discharges spikes to the flip-over mechanism associated with the field side of the apparatus. Certain other parts of the apparatus are omitted for clarity of illustration.
FIG. 19 is a plan view of the parts shown in FIG. 18.
FIG. 24 is a schematic elevational view illustrating, by means of full lines, light dotted lines, and heavy dotted lines, different positions which upright pairs of hydraulic cylinders assume on the vertical rods on which they are slidable, the different positions of the air hammer which moves with the hydraulic cylinders, and the movement of a vertical frame between the cylinders and certain parts carried by said vertical frame.

For intermittently advancing the upper pass of the chain 105' of the feed chain 105 toward the field side of the vehicle there is provided the mechanism best shown in the detail views FIGS. 18 and 19. On an extension of the shaft 108, which is supported by the L-shaped bracket attached to the upper end of one of the upright tubular members 110, is a reel 120 around which is wound a cable 121. The free end 122 of the cable is attached to an arm extending from a plate 123' which is secured to and moves with the brackets 98 and 99 of FIG. 4, but which are associated with the other vertical hydraulic cylinder of the pair of cylinders on the field side of the rail.

When the vertical frame 90 moves downwardly, as later described, the cable 121 turns the reel in a clockwise direction as viewed in FIG. 18, thereby energizing the drum 122' through coil spring 123. When the vertical frame assembly 90 moves upwardly the stored energy in spring 123 turns the shaft on which the sprocket 107 is fixed, thereby moving the upper lap of the spike conveyor chain toward the field side enough to cause one spike to discharge into the upper end of the downwardly and outwardly extending spike feeder slide QF, as is best shown in FIG. 4B.

The Spike Feeder Slides

The spike feeder slides QF comprise a pair of downwardly and inwardly extending tubular members 116 which are held in spaced apart relation at the upper end by a vertically disposed plate 117, the legs 118 of which are affixed to the tubular members 116. The plate 117 also acts to arrest downward movement of the spike and discharge it into contact with the spike feeder slide members 116.

In the further movement of the spike down the spike feeder slide the spike engages the flip-over mechanism S which causes the spike to assume the position shown in FIG. 4B, in which the spike is supported from its head with the body hanging in a substantially vertical position and with the lip 121 of the spike head pointing toward the apparatus, so that when it is finally delivered to the spike locating assembly OF the lip will be disposed in overlying relation with respect to the base of the rail on the field side.

The Upper Spike Arresting and Releasing Means

As the spike slides down the spike feeder slide QF its movement is interrupted by the upper spike arresting and releasing means which, as a whole, bears the numeral 124 and which is perhaps best shown in FIGS. 1 and 4. The upper spike arresting and discharging means is located at the lower end of the upper section of the spike feeder slide.

Figure 21:
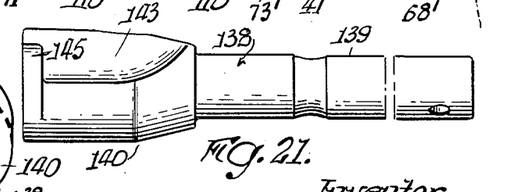
FIG. 21 is a plan view of the right hand member of FIG. 20.

The upper spike arresting and releasing means 124 comprises a cylinder 130 fixed to upright tubular members 110 in which there is an air actuated piston, the piston rod of which projects upwardly and is affixed to a yoke plate 131 from which depend rods 134, the lower ends of which are attached to levers 136. Levers 136 are attached to members 138, which are alike except that they are right and left. As best shown in FIG. 21 member 138 includes an elongated, generally cylindrical body portion 139 and a head portion 140. The body portions of the members 138 are mounted for rotation on a horizontal axis in bearing blocks 141 affixed to the spike feeder slide QF.

Figure 20:
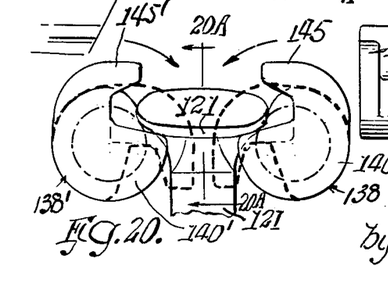
FIG. 20 is a fragmentary detailed elevational view illustrating a pair of right and left hand members which first serve to arrest the downward movement of spikes delivered to the guides which extend downwardly toward the spike locating assembly and then intermittently release the spikes, one at a time, for further downward movement toward a second generally similar spike arresting mechanism arranged at a lower elevation adjacent the upper end of the spike directing chute.

The head 140 of member 138 is shaped at 143 to supportingly receive the underside of the head of the spike and, at one end, is provided with a tongue portion 145, together with the like portion on the companion member 138'. To arrest the downward movement of the spike there is provided a vertically disposed plate 138P which is affixed to upright 110 and which is immediately in front of the lip portion of the spike head and is engaged thereby, when the parts are positioned as shown in FIG. 20. When member 138' is rocked in a clockwise direction and 138 in a counterclockwise direction as viewed in FIG. 21, the tongues 145–145' move downwardly, engaging the head of the spike and forcing it to drop to the upper end of the lower section of the spike feeder slide QF. The spike then slides donwwardly by gravity until again arrested by the lower spike arresting and discharging means, shortly to be described.

It should be understood that air is supplied to the cylinder to move the piston therein at the proper time, as will be explained later. However, it may be stated at this time that air admission is controlled by a solenoid 148 at the lower end of the cylinder 130 (see FIG. 4) and that control of the solenoid is through an electronic switch, which will be described in detail later.

The Lower Spike Arresting and Discharging Means

Figure 22:
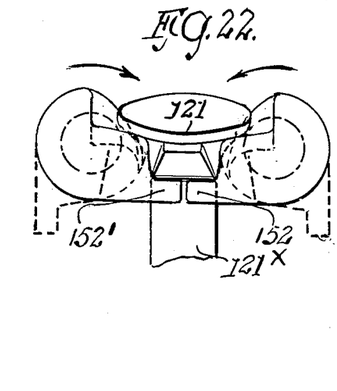
FIG. 22 is a view similar to FIG. 20, but illustrating the second and lower spike arresting mechanism which is generally similar to that shown in FIG. 20, but which has certain modified construction, the purpose of which will be explained later.
Figure 23:
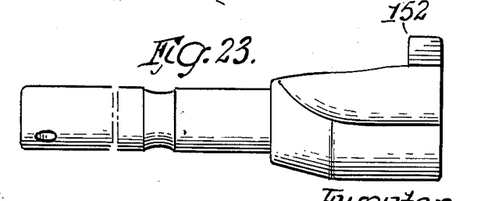
FIG. 23 is a view similar to FIG. 21, but showing the right hand member of FIG. 22.

This means, as a whole, bears numeral 149 and is located at the lower end of the bottom section of the spike feeder slide QF, just above a spike chute 160 that is immediately above and which directs the spike into the spike locating assembly OF. It is similar in construction and operation to the upper spike arresting and releasing means 124, except for certain details which will presently be described. For this reason the description will be limited to the differences involved. These differences are best shown in FIGS. 22 and 23 which are similar to FIGS. 20 and 21, respectively, of the upper arresting means. It will be noted that there are no tongue portions like 145 of FIGS. 20 and 21. Downward movement of the spike is prevented by engagement of the shank portion 121' of the spike which engages extensions 152 and 152'. When the members carrying the portion 152–152' (see FIGS. 22 and 23) are rotated in the direction of the arrows, the portions 152 and 152' move away from the spike, thus permitting the spike to drop by gravity into delivery chute 160. Portion 161 of a member 162 is pivoted on chute 160 at 163 for rocking movement. The member 162 retains the spike in proper position with the lip of the spike pointing away from the base portion of the member 165 of chute 160 for correct positioning of the spike in the spike locating assembly, as shown in FIG. 6.

Figure 7:
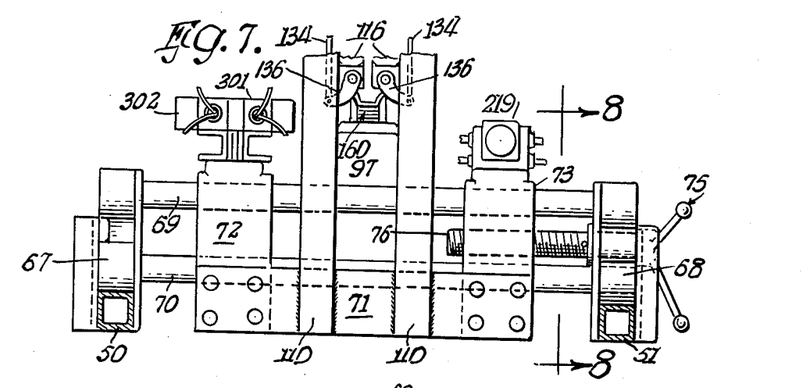
FIG. 7 is a fragmentary sectional view in elevation through the movable sub-frame taken on the line 7—7 of FIG. 2.
Figures 8, 9, 10, 17:
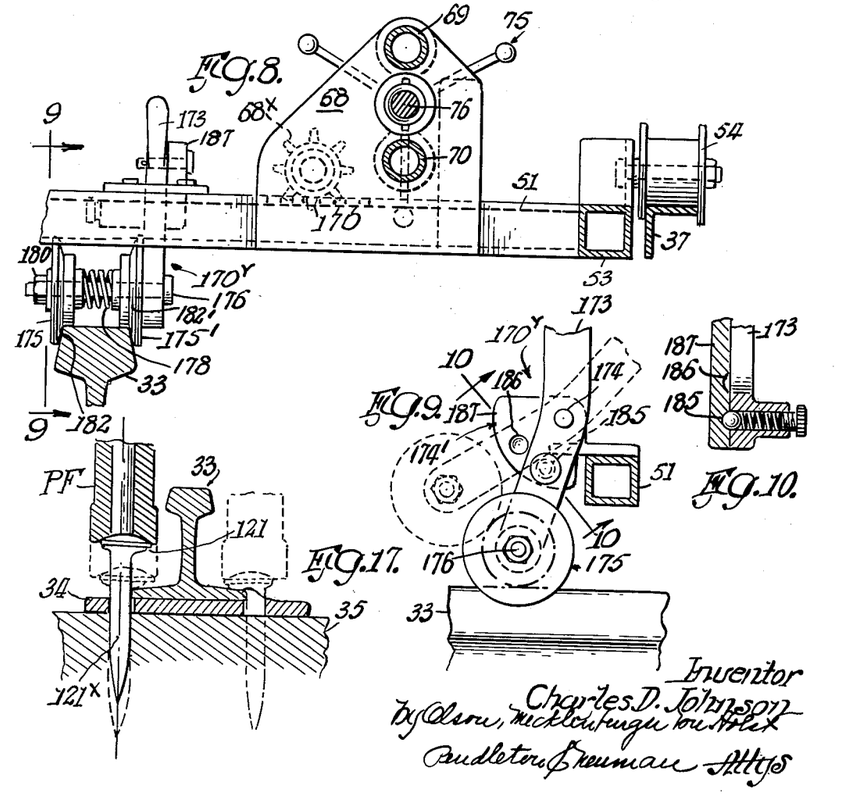
FIG. 8 is a vertical sectional view on the line 8—8 of FIG. 7.
FIG. 9 is a fragmentary sectional view on the line 9—9 of FIG. 8.
FIG. 10 is a detail fragmentary sectional view on the line 10—10 of FIG. 9.
FIG. 17 is a detailed vertical sectional view on the line 17—17 of FIG. 16, but showing also lower portions of the air hammers as positioned for driving spikes.

Means for Moving Brackets 67 and 68, Rods 69 and 70, Cantilever Brackets 72 and 73, and Parts Carried Thereby This mechanism is best shown in FIGS. 2, 7, and 8. Brackets 67 and 68 can be moved along the members 50 and 51 of the movable sub-frame I by rotating sprocket wheels $67^x$ and $68^x$ which are mounted for rotation on a horizontal axis in brackets 67 and 68. The teeth of the sprocket wheels enter holes 170 in the sub-frame members 50 and 51. Any suitable tool may be used manually to turn sprocket wheels $67^x$ and $68^x$, rotation in one direction causing movement of brackets 67 and 68 toward the rail and rotation in the opposite direction causing movement away from the rail.

By the means just described proper adjustment of the spike locating assembly toward and away from the rail can be effected.

Movement of cantilever brackets along the rods 69 and 70 relative to similar brackets 72' and 73' is effected by turning hand wheel 75 to turn the threaded shaft 76, as before described.

The above two mechanisms, together with similar mechanism associated with the gauge side of the rail, enable the operator to set the spike locating assemblies so that they will be properly spaced relative to the two holes in the particular tie plate through which the shanks of the spikes are to pass. It will be understood that, once this setting has been made, no further adjustment is required, so long as the tie plates remain of like construction, which is usually the case for any given rail section.

Gauging Mechanism

Located midway of the cross members 50 and 51 of the movable sub-frame I are gauging mechanisms $170^x$ and $170^y$ (best shown in FIGS. 2, 8, 9, and 10). Since they are alike in construction, a description of one will suffice for both. This mechanism comprises a hand lever 173, pivoted at 174 in a bracket 174' adjustably mounted the adjacent cross member of the movable sub-frame to permit swinging movement between the full and dotted line positions shown in FIG. 9. The lower portion of lever $173^x$ carries a pair of flanged rollers 175 and 175' mounted for rotation on a bolt-like shaft 176. Expansion spring 178 tends to force the flanged rollers 175 and 175' apart, movement being limited by adjusting nut 180 and lever portion 173, respectively.

The flanged rollers 175 and 175' are shaped at 182 and 182' to conform to portions of the top and sides of the rail head, as best shown in FIG. 8.

To hold the lever 173 in the operative and inoperative positions shown in FIG. 9 there are provided sockets 185 and 186 in the plate portion 187 of the bracket 174' on which the lever 173 is swingably mounted. A spring pressed ball arrangement (see FIG. 10) serves to hold the lever in either of two positions shown in FIG. 9.

The purpose of swinging the flanged rollers upwardly is to permit passage of switches and for dead heading the apparatus along the track when not being used for strike driving purposes.

It should be understood that the adjustment of the spike locating assemblies, as before described, will have been made after the adjustment of the flanged rollers 175 and 175' to the rail head.

The movable sub-frame I and all the parts carried thereby will now retain the proper relationship to the rail and the plate, regardless of slight transverse movement of the frame of the main vehicle relative to the rail and regardless of the slight transverse movement the sub-frame makes relative to the flanged wheels 54 and 54ˣ which ride on the longitudinal members 37 of the main vehicle frame.

Figure 26:
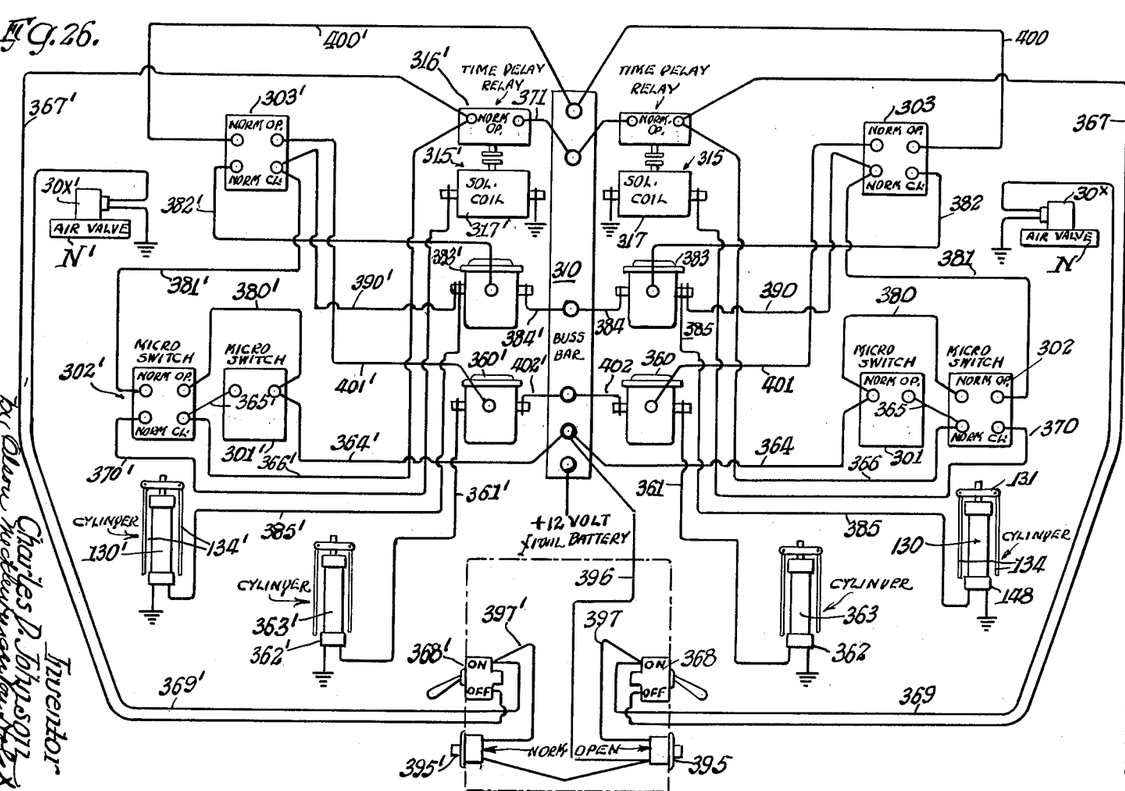
FIG. 26 is a diagrammatic view of the wiring system and certain parts associated therewith for illustrative purposes.

It is believed that the functioning of the apparatus will be understood by reference to the diagrammatic views 25 and 26, in which parts shown therein are given the same numbers as like parts as shown in the other views of the drawings.

The Hydraulic System

The hydraulic system is schematically depicted in FIG. 25, all of the parts shown therein being mounted on the main vehicle A (FIG. 1). The prime mover (engine) C drives the double hydraulic pump C1. The inlet side is connected by line 201 to the reservoir L. Outlet 202 leads to a four-way spool-type valve 203, the spool of which is shifted by rod 203' which is operatively connected to the foot pedal E (FIG. 1) on the main vehicle. When the spool is in one position the fluid flow is through line 204 to line 205 to propelling motors FM and RM, and back through lines 207 and 208 to valve 203 and, thence, through line 209 to the reservoir L. This flow drives the vehicle in one direction. By shifting the spool of the valve 203, reverse drive is obtained in which event the flow is reversed, i.e., from 202 to valve 203 to line 208 to lines 207, 205, 204 to valve 203 and line 209 to the reservoir.

Flow to the hydraulic cylinders K and K' is from outlet 10 of pump C1 through line 211 to the sub-plate assembly 212 of the accumulator M.

At the bottom of sub-plate 212 is a check valve 214. Normal flow is through line 215, through check valve 214. Passage beyond check valve 214 leads through line 216, the accumulator chamber 213, and also through lines 217 and 218 to control valves 219, 220, and 219'.

Normally oil flows into the accumulator chamber 213 until pressure reaches a pre-determined magnitude, at which time pilot signal through line 230' activates unloading valve 230. Check valve 214 closes, trapping oil in chamber 213 and lines 218 and 217. This shunts the pump volume through 230 to line 231, back to reservoir L. When chamber 213 discharges, the lowered pressure again restores unloading valve 230 to normal condition, as first described.

Thus, when oil is needed to actuate the four vertical cylinders K, K', and the two horizontal cylinders 236 and 236' associated with the spike positioning assembly by means of control valves 219, 221, and 220, fluid under pressure is available.

To actuate the spool of valve 220 the operator moves the lever G. When lever G is in one position the spool of valve 220 is so disposed that fluid flow will be from line 218, through 220, through line 236ˣ, to double restriction device 237, and by lines 238 to the upper ends of rods 80, the lower ends of which are bolted to the tops of the cantilever bracket member 72 and 73, as before described, then through passageway 86 in rods discharging as before described, through cross passages 87 adjacent piston portion 84 and, thus, forcing cylinder K upwardly (see FIG. 11).

The operator holds lever against the spring (not shown) which urges the lever toward neutral until the cylinders K and K' reach uppermost position, at which time release of lever G returns it to neutral, at which time the spool of valve 220 cuts off the flow of oil from line 218 to 236.

To Lower Cylinders K and Various Mechanism Carried to Move Therewith

To lower such mechanism operator moves lever G in the opposite direction, thus shifting the spool of valve 220 to connect lines 238 and 236ˣ to through valve 220 and then line 240, so that flow is back to reservoir L.

The restrictions 237' in member 237 control speed of downward movement of the cylinders K, K', and associated parts and, also, equalize flow so both sets of cylinders K and K' move together at the same speed.

Control for Jaw Structure Associated With Spike Positioning Assembly

The opening and closing of the jaws of the spike positioning assembly OF is by means of cylinder 236 which slides back and forth on rod 253, which includes a piston portion intermediate its ends.

Assume the mechanism is in its upper position. At that time flow is from line 217 through line 251, through valve 219, line 252 to the connection at one end of rod 253. Since rod 253 is stationary, fluid will have moved cylinder 236 to the position shown in full lines (closed position) in schematic piping FIG. 25 and the FIGS. 12 and 13, ready to receive the spike. It should be stated that the spike will have been fed to position between the jaws before hydraulic cylinders K and K' and associated mechanism starts down.

Under force of gravity the entire driving assembly moves down together, until the bottom end of the vertical guide frame assembly 90 thereof engages an adjustable vertical stop 90' on a fixed part of the sub-frame of the vehicle. At this time, further downward movement of guide frame assembly 90 is prevented, but other mechanism of the driving assembly continues its downward movement, parts sliding on vertical guide rods 95 of the guide frame 90, as before described. This causes the hammer socket of the air gun PF to engage spike head and drive the spike about an inch and one half because, as will be explained later, the air valve N will have been opened to deliver air to air hammer, setting it in operation.

Figure 5:
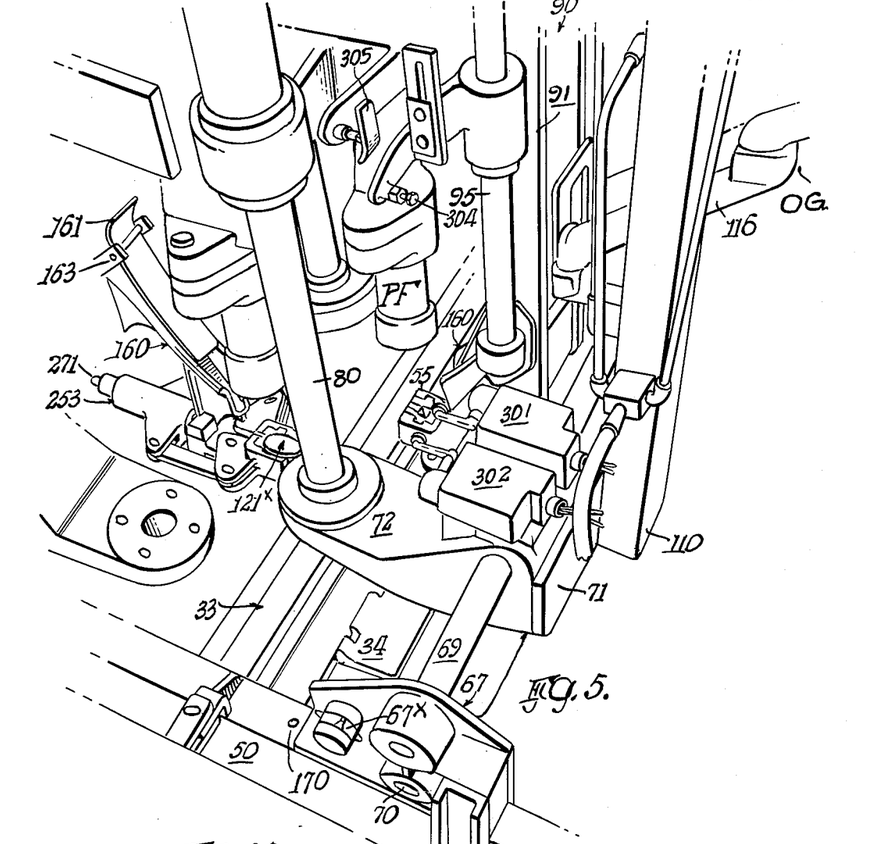
FIG. 5 is a fragmentary perspective view of certain of the lower parts shown in FIG. 4, with one of the parts removed for illustrative purposes and on a scale greater than that of FIG. 4.
Figures 12, 13:
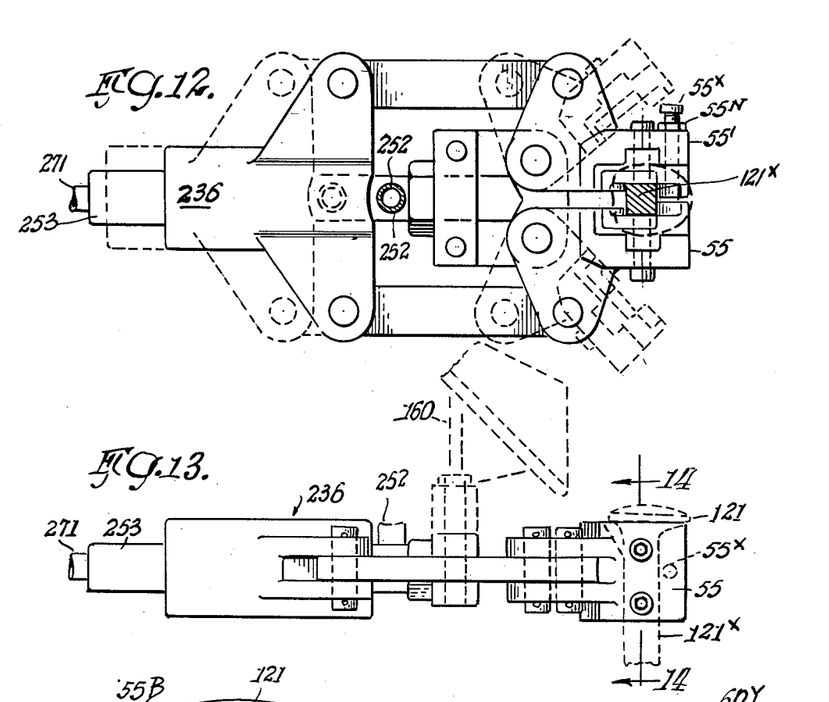
FIG. 12 is a detail plan view on an enlarged scale relative to FIG. 2 of the spike locating assembly.
FIG. 13 is a side elevation of the parts shown in FIG. 12.
Figure 14:
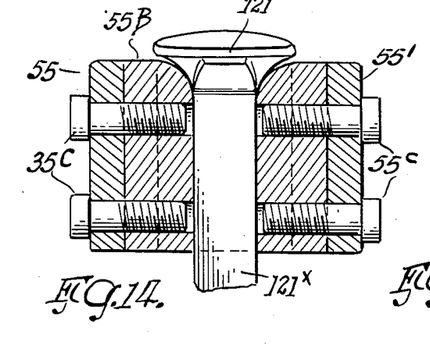
FIG. 14 is a detailed vertical section on the line 14—14 of FIG. 13, but on an enlarged scale.
Figure 15:
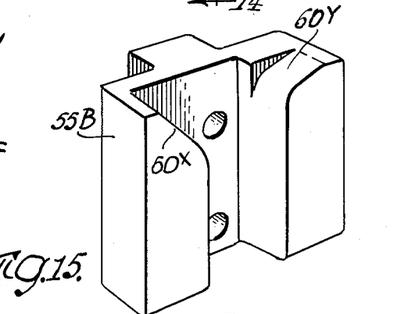
FIG. 15 is a perspective view on the scale of FIG. 14 of one of the spike engaging blocks (of which there are right and left members) one of which is mounted in each of the two swingable jaws, each pair of jaws of the spike locating assemblies best shown in FIGS. 12, 13, and 14.

Cam 260, carried by one of the cylinders K, then engages a projecting portion of spool of valve 219, forcing same inwardly and, thereby, moving spool so that line 252 is connected to line 270 which leads back to the reservoir at the same time line 251 is connected to line 271 which is connected, as shown most clearly in FIG. 5, to cause cylinder 236 to move outwardly on stationary rod 253, thereby moving the jaws 55 to the open dotted line position by means of the levers and linkage clearly illustrated in FIGS. 12 and 13, and permitting air hammer cylinder (front head) to continue down into a position between the open jaws of the assembly OF and letting the reciprocating anvil of the air hammer complete the driving operation.

Upward Action

As before explained, during a cycle of operation cylinders K move upwardly, as do cylinders K'. When cylinder K reaches its top position, a projection 235 on the upper end of cylinder K (see FIG. 25) engages and operates the micro-switch in wiring diagram FIG. 26, which actuates snap switch associated with the cylinder of the lower spike arresting mechanism and which permits the spike to fall, by gravity, into position between the closed jaws of the spike positioning assembly OF. The parts will then be in position to drive another spike as before described.

Hydraulic Means for Holding Sub-Frame Against Movement Due to Inertia

For this purpose, as before explained in connection with FIG. 2A, there is provided a hydraulic cylinder 56 having a piston rod 61 passing therethrough and having an intermediate piston portion 60, one end of the piston rod at 62 being connected to stud 63 of the sub-frame member 50. Hydraulic line 294 leads from pump outlet 202' to a point adjacent cylinder 56.

Piping adjacent cylinder 56 comprises check valves 295, 295', 296, and 296'. Check valves 296 and 296' are connected by lines 297 to reservoir L.

Functioning When Vehicle Is Moving

Pressure builds up in line 294 because of pressure required to operate motors RM and FM and because check valves 295 and 295' prevent flow therethrough. Oil previously in cylinder 56 is trapped because check valves 296 and 296' will not permit flow to reservoir L. Hence piston portion 60 and its rod 61 cannot move. Therefore, sub-frame I is held stationary.

When hydraulic drive to the vehicle hydraulic motors (on the order of 850 p.s.i.) is cut off, pressures of a substantially lower order obtain in the system (on the order of 50 p.s.i.) for pressure drop through the lines to the reservoir. It should be noted that this is not accumulator pressure, which is in the other side of the pump. Should sub-frame I be moved in the direction of arrow (see FIG. 25), piston 60 forces oil out of check 295' to line 294, thence through line 202 to valve 203 to reservoir L. The oil is also drawn from reservoir L, through line 297 to check valve 296 to the opposite side of piston 60.

Reverse movement of piston 60 forces fluid out check valve 295 and draws in through fluid check valve 296'.

Electrical Circuit Switches and Certain Associated Parts

It will be noted by reference to schematic view FIG. 26 that certain parts and circuits are in duplicate, one for the field side and the other for the gauge side. Hence a description of one side of such parts and circuits will suffice for both sides. Corresponding parts in other views bear like numbers primed.

Assume that the hydraulic cylinders K and all parts which move therewith are in the uppermost position and start to move downwardly by gravity, as explained earlier in the specification.

In the electrical circuit are certain snap switches hereinafter generally termed micro-switches. Micro-switches also appear in FIGS. 2, 4, and 5.

Carried by the bracket 99 of the cylinder assembly K are lower and upper cam members 304 and 305, respectively, cam member 304 being positioned to actuate the micro-switch 301. When it engages micro-switch 301, it closes the circuit to solenoid $30^x$ of air valve N energizing same and opening the valve to permit air under pressure to be delivered to the pneumatic hammer, causing reciprocation thereof on the order of 1200 per minute. The air hammer is or may be of conventional construction, except that the spike head engaging portion is shaped to conform to the spike head. Hence detailed description of the air hammer is not thought necessary.

In the event the spike to be driven is not aligned with the hole in the tie plate, the lower end of the pneumatic hammer will engage the head of the spike and, because the whole mechanism is merely being lowered by gravity, the spike serves to prevent further downward movement of the air hammer, vertical framing, and other parts connected therewith. The operator, noting this, jiggles sub-frame I in forward and reverse directions to cause proper alignment of the spike with the hole in the tie plate, which then permits the air hammer to lower further, so that cam member 304 engages the micro-switch 301 as before described. Such engagement first completes the circuit to air valve solenoid $30^x$ energizing same and opening the air valve to permit air flow to the air hammer. It also energizes the time delay relay device 315, the function of which will be described shortly.

As the spike is driven, the cylinders K, brackets 98 and 99, and air hammer PF all move down together until finally the higher cam member 305 operatively engages micro-switch 302.

The electrical circuit includes a buss bar 310 energized from a 12-volt battery (not shown).

Micro-switch 301 is normally open.

Micro-switch 302 is a double pole type switch, one side being normally open and the other side normally closed.

Micro-switch 303 is a double pole type switch, one side being normally open and the other side normally closed.

Time delay relay switch 315 includes normally open switch section 316 and a solenoid coil section 317.

With the cylinders K and associated parts in upper position, the following electrical characteristics obtain:

Normally open side of switch 303 has been closed by the final end upward movement of cylinder K and associated parts and stays closed until the whole assembly starts down, at which time it then reverts to its normal condition, before described, and will so remain until the cylinders K and connected parts again reach uppermost position.

Closing the normally open side of switch 303 energizes solenoid 360 by means of line 400 from buss bar 310 through switch 303 and line 401 to solenoid 360, so that current then flows from buss bar 310, line 402 through solenoid 360 to line 361 and thence to the solenoid valve 362 on air cylinder 363, thus causing the lower spike arresting mechanism to function to release a spike to chute 160 which, in turn, delivers the spike to the spike locating assembly OF as before described.

The mechanism is now ready to start down, as previously described, and, assuming alignment of the spike with the tie plate holes, the lower cam 304 makes contact with micro-switch 301 (normally open) momentarily closing the circuit so that current flows from buss bar 310 through line 364 through switch 301 to line 365, thence through line 366 to one terminal of normally open micro-switch 316 of 315 through line 367 through on and off switch 368, thence through line 369 to solenoid $30^x$ of air valve N.

Also, the current flows through normally closed side of switch 302, then to line 370 to solenoid 317 on time delay relay 315, thus energizing same and raising plunger P engaging plunger P' and closing the normally open switch of the time delay relay 316. This in turn forms a circuit from buss bar 310 through line 371, through switch 316, line 367 to on and off switch 368 back to the solenoid $30^x$ of air valve N through line 369.

As soon as the first cam 304 passes switch 301 the switch returns to its normally open position, but a circuit has been completed through normally closed circuit on micro-switch 302 to solenoid coil 317 of the time delay relay mechanism 315. This supplies air to the air hammer and driving of the spike starts.

When the hammer actually contacts the base of the rail, the upper cam 305 (FIG. 4) actuates micro-switch 302, causing the normally closed side to open, breaking the circuit through line 370 to solenoid coil 317 of the time delay relay 315, permitting plunger P to drop. Plunger P' is connected to a mechanism in switch 316 which can be set to delay return to open position so that circuit continues through lines 367 and 369 to air valve N, thus continuing the operation of the hammer for a predetermined length of time, sufficient to complete driving of the spike to final position, after which the circuit is broken, thus stopping further action.

Engagement of cam 305 also closes the normally open side of micro-switch 302. Current then flows from buss bar 310 through line 364, line 380 through normally open side of switch 302, now closed by cam 305, to line 381, thence through normally closed side of switch 303, line 382 to solenoid 383. Then current flows from the buss bar 310 through line 384, solenoid 383, line 385 to solenoid valve 143 of air cylinder 130. Actuation of the piston in the air cylinder 130 releases a spike, permitting it to slide downwardly to the lower spike arresting mechanism before described.

Current flow is also from buss bar 310 by line 384 to and through solenoid 383, thence by line 390 through normally closed side of switch 303, then on through line 382, back to solenoid 383. This forms a holding circuit to solenoid 148 of air cylinder 130. As cylinders K and K' are raised, cam 305 releases switch 302, permitting it to return to its normal position. Cylinders K and K' and parts carried thereby then move up to top position, at which time projection 235 on cylinder K (see FIG. 25) again actuates switch 303, again to energize solenoid 362 of air cylinder 363, as before described.

The last mentioned operation also opens the normally closed side of switch 303, breaking the circuit from buss bar 310 to solenoid 383, de-energizing the solenoid valve 148 of the air cylinder 130. This causes the piston rod of cylinder 130, which is connected to yoke bar 131, to drop and, through rods 134 and arms 136, to rotate the members 138 and 138'. Such rotation moves the portions 145 and 145' from the dotted line position (FIG. 20) to the full line position, thus automatically placing such parts in a position to accept the lowermost spike of a plurality of spikes sliding down the spike feeder slide QF (see FIG. 20A). The apparatus is now in condition for another cycle of operation.

Previously a holding circuit has been described in connection with solenoid 383 and certain other parts.

The purpose of the holding circuit is to prevent the passage of a spike from the upper spike arresting mechanism to a position above the lower spike arresting mechanism until the hydraulic cylinders and associated parts have gone up to the top and returned to its lower actuating position. Under certain conditions, the operator might accidentally, or otherwise, raise the hydraulic cylinders K and K' but part way up before the spike has been fully driven home and again lower the same. The spike arresting mechanism would then again have become operative to feed another spike into position above the lower spike arresting mechanism so that there would be two spikes in that position, which is not desired because it would likely cause jamming of the spike driving mechanism. Hence the holding circuit above described continues until cylinders K and K', air hammer, etc. reach the upper limit of travel, at which time micro-switch 303 is actuated, opening normally closed side thereof, as before described.

Secondary Spike Driving Control

It may happen that, in the normal operation of this mechanism, a spike may not be fully driven, even after the slight time delay action of switch 315, which functions to de-energize the solenoid of air valve N. This would leave a spike sticking up a bit above the base of the rail, which is not desired. In order to complete the driving operation, it is required that the air valve N be caused to open again for a short time so that air (which at that time had been cut from the air hammer) could again be supplied thereto.

This action is effected by pushing button 395, closing the circuit to the solenoid of the air valve N. This allows current to flow from buss bar 310, through lines 396, 397, and 369, to energize solenoid 30$^x$ of air valve N. Operator holds button in so long as continued driving is desired. Because of these various controls, it is possible to obtain rapid, satisfactory operation of the apparatus under the various conditions met with in practice.

The apparatus before described functions to drive spikes on the field and gauge sides of a single rail of the track. To drive spikes for the other rail, the apparatus is lifted and turned 180 degrees. This may be done by means of a crane or in any suitable manner.

Further Comments

Under the heading starting on column 9 there follows a description of the upper spike arresting means. FIG. 20A illustrates, in more detail, the position of the spikes relative to the plate 138P and the member 138'. It will be noted that the lip of the lowermost spike engages the plate 138P which prevents further movement of the spike downwardly. It will also be noted that additional spikes, only a few of which are shown, are disposed in the slide 116, tending to slide downwardly and applying considerable pressure against the lowermost spike. However, when members 138 and 138' (see FIG. 20) are rotated in the direction of the arrows, the lowermost spike is forcibly moved downward to the second or lowermost section of the spike feeder slide.

Thus, while there will always be a plurality of spikes in the upper section of the spike feeder slides on both the field and gauge sides, there will be but an individual or single spike supplied to the lower section of the guides per cycle of operation. This positively avoids any jamming of spike at the place where the spike passes from the lower restraining means to the chute 160, which, as before explained, moves in a vertical direction with the spike positioning assembly, which might obtain if several spikes were present at that place.

From the foregoing description, it will be appreciated that, at the time the spike first engages the tie, the spike will be firmly held in the jaws of the spike positioning assembly, perfectly normal to the plane of the tie; also, that as the jaw assembly moves downwardly with the vertical frame 90, the hammer will operate to drive the spike approximately one and one half inches into the tie before the jaws open. This arrangement makes certain that after the jaws have been opened to permit further downward movement of the air hammer the spike will continue to be driven vertically.

In connection with the wiring diagram 26, reference has been made to certain solenoids 383 and 360 and time delay relay 315. These do not appear because they are positioned within the cabinet N$^x$ (see FIG. 1).

Referring particularly to FIGS. 12, 13, 14, and 15, it should be stated that the blocks 55B are removably held in the jaws 55 and 55' by means of bolts 55C so that the blocks may be replaced when necessary, due to wear.

Also, it will be noted that the upper portions of the block 55B are provided with downwardly and inwardly sloping surfaces 60$^x$ and 60$^y$. As the spike slides from the lower end of chute 160, the end of the spike engages surfaces 60$^x$ and is guided into the space between the confronting surfaces 60S of the blocks so that the spike finally comes to rest with the lip portion of the spike head engaging the surface 60$^y$, as best shown in FIG. 13.

In order to limit the closing of the jaws 55 and 55' so that space will be available therebetween to permit the shank of the spike to slide downward when delivered to the spike positioning assembly, there is provided an adjusting screw 55$^x$ which is operated in a threaded opening in one of the jaws with the end of the screw contacting the opposite jaw, as best shown in FIG. 12. Nut 55N locks screw 55$^x$ in adjusted position.

It is believed that the stated advantages of the apparatus and operation will be appreciated by those skilled in the art to which the invention relates without further comment.

I claim:

Apparatus for driving railway spikes through spike-receiving holes in tie plates and into the underlying tie, comprising in combination a wheeled vehicle having a frame and being adapted to movement along the rails, a sub-frame supported from the vehicle frame and mounted for movement longitudinally of the vehicle frame for the field and gauge sides of the rail, spike-locating means carried by said sub-frame and adjustably positionable on said sub-frame relative to a tie plate, means for moving said sub-frame longitudinally of the vehicle frame, means for delivering spikes to said spike-locating means with the lip portions of the spikes overlying base portions of the rail, the spike-delivering means delivering spikes to the field and gauge sides of the rail and having means for conveying spikes for one side of rail from a position on the other side of the rail; support means supportably engaging opposed portions of said conveying means and supportably mounted on said sub-frame; the conveying means including means for reversing the disposition of the spike lips relative to the underlying rail traversed in the course of being conveyed; and means for driving the spikes downwardly with the shanks of the spikes extending through the underlying spike-receiving holes in the tie plate on the field and gauge sides and into the tie thereunder; the spike driving means being supportably and adjustably positionable on said sub-frame relative to said spike-locating means.

References Cited in the file of this patent

UNITED STATES PATENTS

| | | |
|---|---|---|
| 421,908 | Close | Feb. 25, 1890 |
| 976,513 | Smith | Nov. 22, 1910 |
| 1,347,943 | Forsyth | July 27, 1920 |
| 1,856,893 | Talboys | May 3, 1932 |
| 2,018,129 | Jackson | Oct. 22, 1935 |
| 2,910,010 | Godfrey et al. | Oct. 27, 1959 |
| 2,925,048 | McWilliams et al. | Feb. 16, 1960 |
| 3,111,909 | Plasser et al. | Nov. 26, 1963 |
| 3,120,195 | McWilliams | Feb. 4, 1964 |